US012046437B2

(12) United States Patent
Samuels et al.

(10) Patent No.: US 12,046,437 B2
(45) Date of Patent: Jul. 23, 2024

(54) FUSE ELEMENT ASSEMBLY AND METHOD OF FABRICATING THE SAME

(71) Applicant: Eaton Intelligent Power Limited, Dublin (IE)

(72) Inventors: John Thomas Samuels, Wildwood, MO (US); Michael Craig Henricks, Ellisville, MO (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/456,414

(22) Filed: Aug. 25, 2023

(65) Prior Publication Data

US 2023/0411100 A1 Dec. 21, 2023

Related U.S. Application Data

(62) Division of application No. 15/163,363, filed on May 24, 2016, now abandoned.

(51) Int. Cl.
*H01H 85/38* (2006.01)
*H01H 85/10* (2006.01)
*H01H 85/18* (2006.01)
*H01H 85/042* (2006.01)

(52) U.S. Cl.
CPC ............ *H01H 85/38* (2013.01); *H01H 85/10* (2013.01); *H01H 85/18* (2013.01); *H01H 85/042* (2013.01); *H01H 2085/388* (2013.01)

(58) Field of Classification Search
CPC .. H01H 85/0013; H01H 85/042; H01H 85/08; H01H 85/18; H01H 85/175; H01H 85/38; H01H 85/055; H01H 85/10; H01H 2239/044; H01H 2085/388; H01H 2231/026; H01H 85/165
USPC ................................ 337/159, 165, 227, 276
See application file for complete search history.

(56) References Cited

U.S. PATENT DOCUMENTS

| | | | | | | |
|---|---|---|---|---|---|---|
| 480,802 | A | * | 8/1892 | Blathy | H01H 85/38 | 337/278 |
| 3,743,994 | A | * | 7/1973 | Kozacka | H01H 85/055 | 337/159 |
| 3,766,509 | A | * | 10/1973 | Cameron | H01H 85/042 | 337/296 |
| 3,810,062 | A | * | 5/1974 | Kozacka | H01H 85/055 | 337/296 |
| 3,843,948 | A | * | 10/1974 | Kozacka | H01H 85/042 | 337/276 |
| 4,636,765 | A | * | 1/1987 | Krueger | H01H 85/0458 | 337/279 |
| 4,646,053 | A | * | 2/1987 | Mosesian | H01H 85/157 | 337/252 |
| 4,951,026 | A | * | 8/1990 | Ehlmann | H01H 85/165 | 337/248 |
| 4,972,170 | A | * | 11/1990 | Ehlmann | H01H 85/1755 | 337/248 |
| 5,245,308 | A | * | 9/1993 | Herbias | H01H 85/38 | 337/276 |

(Continued)

*Primary Examiner* — Anatoly Vortman
(74) *Attorney, Agent, or Firm* — Baker Botts L.L.P.

(57) ABSTRACT

A fuse element assembly has been disclosed. The fuse element assembly includes a fuse element having a pair of side edges and at least one weak spot between the side edges. The fuse element assembly also includes an arc-quenching material attached locally to the fuse element adjacent the weak spot.

20 Claims, 5 Drawing Sheets

(56) References Cited

U.S. PATENT DOCUMENTS

| | | | | | |
|---|---|---|---|---|---|
| 5,252,942 | A * | 10/1993 | Gurevich | H01H 85/055 | 337/159 |
| 5,345,210 | A * | 9/1994 | Swensen | H01H 85/38 | 337/166 |
| 5,426,411 | A * | 6/1995 | Pimpis | H01H 85/165 | 337/186 |
| 5,596,306 | A * | 1/1997 | Kowalik | H01H 85/38 | 337/165 |
| 5,714,923 | A * | 2/1998 | Shea | H01H 85/055 | 337/159 |
| 6,160,471 | A * | 12/2000 | Rybka | H01H 85/055 | 337/276 |
| 6,888,440 | B2 * | 5/2005 | Ackermann | H01H 85/10 | 337/296 |

* cited by examiner

FUSE ELEMENT ASSEMBLY AND METHOD OF FABRICATING THE SAME

PRIORITY

This application is a divisional under 35 U.S.C. § 121 of U.S. patent application Ser. No. 15/163,363, filed May 24, 2016, which is incorporated herein by reference in its entirety.

BACKGROUND

The field of the invention relates generally to fuse elements and, more particularly, to fuse elements having an arc-quenching material attached thereto.

Fuses are widely used as overcurrent protection devices to prevent costly damage to electrical circuits. Fuse terminals typically form an electrical connection between an electrical power source or power supply and an electrical component or a combination of components arranged in an electrical circuit. One or more fuse elements is connected between the fuse terminals, so that when electrical current flowing through the fuse exceeds a predetermined limit, the fuse element melts and opens one or more circuits through the fuse to prevent electrical component damage.

Electrical arcs occasionally develop along fuse elements, particularly at locations of melting in overcurrent conditions. The arcs can cause the housing, in which the fuse element is contained, to rupture if the arcs are allowed to persist for extended periods of time. To minimize the duration of an arcing event, fuse elements are often embedded in a loose matrix of arc-quenching material within the housing, and the matrix absorbs the vaporized metal that sustains the arc over time. However, the loose matrix alone may be insufficient to expediently quench arcs generated within some fuses such as, for example, compact-size, higher-voltage, direct current (DC) fuses. It is thus desirable in some applications to supplement the arc-quenching capability of the loose matrix.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION

Exemplary embodiments of electrical fuse element assemblies are described below. Method aspects will be in part apparent and in part explicitly discussed in the description.

Power systems for electrically powered vehicles, referred to herein as electric vehicles (EVs), operate at higher voltages than power systems of vehicles powered by conventional, internal combustion engines. The higher voltages enable the batteries of the EV to store more energy from a power source and provide more energy to an electric motor of the EV. In general, EV manufacturers are seeking to maximize the mileage range of the EV per battery charge, which, in many other types of power systems, would typically necessitate a size increase for the respective components (e.g., fuses) of the power system. However, providing the power system of an EV with larger components can increase the mass of the EV, which can serve to effectively decrease the mileage per battery charge. As such, the EV power system component industry is trending toward smaller and lighter component options that meet the needs of EV manufacturers without sacrificing circuit protection performance.

At least some known EV power systems operate at voltages as high as 450 VDC, yielding very demanding operating conditions for components (e.g., fuses) of such power systems. For example, with respect to the power system fuses in particular, electrical arcing can be powerful at such high voltages, and the fuses are thus required to have arc-quenching specifications that can be difficult to meet, especially considering the industry preference for a reduction in the fuse size. In other words, higher arc-quenching capabilities are required, in a significantly reduced amount of space. In that regard, exemplary embodiments of electrical circuit protection fuses are described below that address these and other difficulties. More specifically, in addition to the inventive arc-quenching capability of the exemplary fuse embodiments, the embodiments offer compact size, relatively higher power handling capacity, higher voltage operation, full-range time-current operation, lower short-circuit let-through energy performance, high current limiting performance, long service life, and high reliability in terms of nuisance or premature fuse operation.

While described in the context of EV applications and particular types/ratings of fuses, the inventive arc-quenching aspects disclosed herein are not necessarily limited to EV applications or to a particular type or rating of fuse. Rather, the benefits of the invention are believed to more broadly apply to many different power system applications (e.g., fuses in photovoltaic power systems), and can also be practiced in part or in whole to construct different types of fuses having similar or different ratings than those discussed herein.

Figure 1:
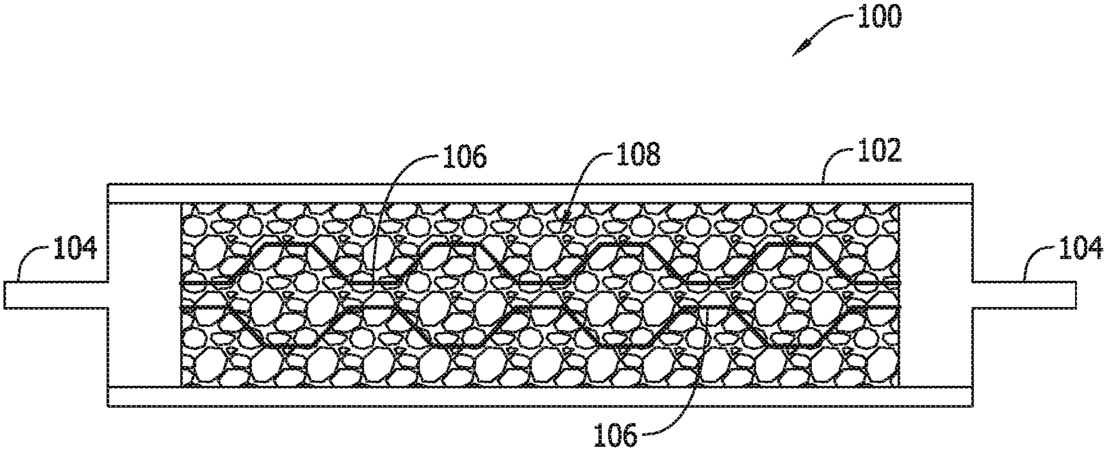
FIG. 1 is a schematic illustration of a fuse.

FIG. 1 illustrates one embodiment of a fuse 100 (e.g., a compact-size, high-voltage, direct current (DC) fuse), such as a fuse for use in the power system of an EV (e.g., the fuse 100 may be constructed to have a voltage rating of at least 500 VDC, and a current rating of at least 150 A, in some embodiments). In the illustrated embodiment, the fuse 100 has a housing 102, a pair of terminals 104 coupled to the housing 102, and at least one fuse element 106 (e.g., a pair of fuse elements 106) extending between the terminals 104 within the housing 102. The fuse element(s) 106 are embedded in a loose matrix 108 of granular, arc-quenching material (e.g., a quartz silica material). The terminals 104 are sized for insertion into a suitable fuse holder (not shown) such that line side circuitry (not shown) is electrically connected to one of the terminals 104, and load side circuitry (not shown) is electrically connected to another of the terminals 104. The fuse element(s) 106 thus serve to protect the load side circuitry in overcurrent and/or short circuit conditions, in that the fuse element(s) 106 will melt and open the circuit under such conditions. Notably, in some applications (e.g., EV applications), the housing 102 may have a compact size such as, for example, a volume of less than about four cubic inches (e.g., a volume of about three cubic inches). For example, in one contemplated embodiment, the housing 102 is substantially cylindrical, with a radius of about 0.808 inches and a length of about 1.587 inches. Other housing sizes are also contemplated without departing from the scope of this invention.

Figure 2:
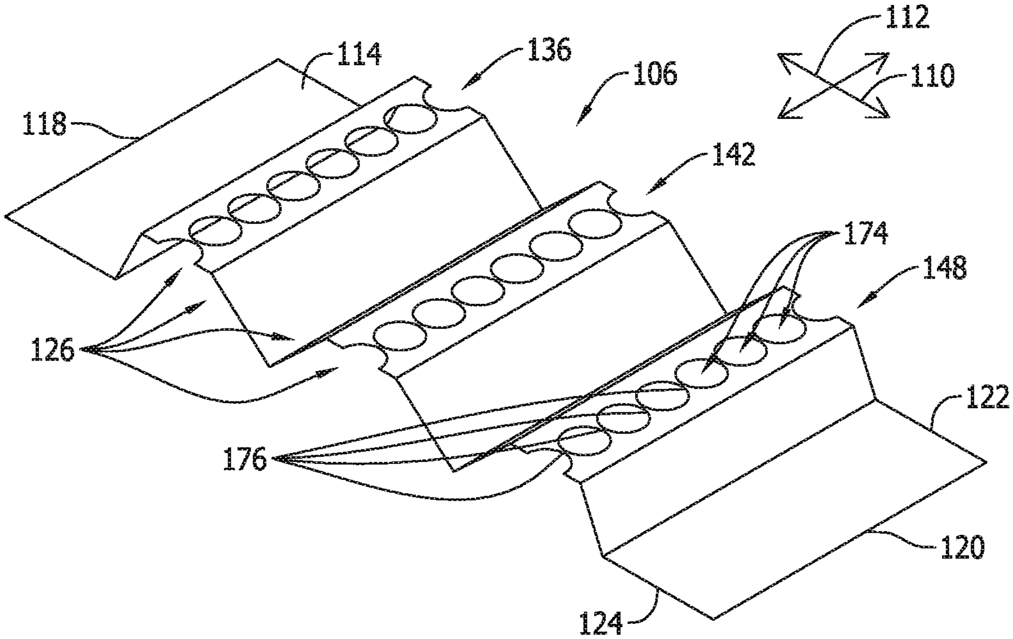
FIG. 2 is a perspective view of a fuse element of the fuse shown in FIG. 1.
Figure 3:
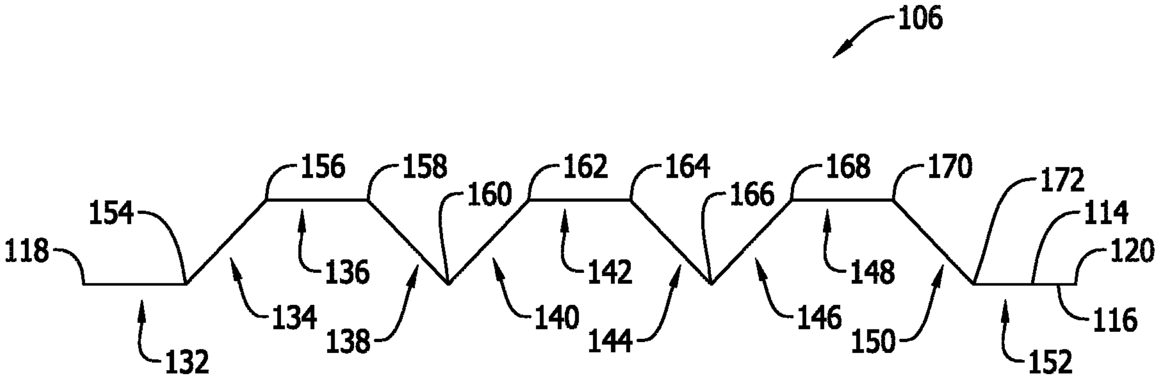
FIG. 3 is a side view of the fuse element shown in FIG. 2.

With reference now to FIGS. 2 and 3, each fuse element 106 is a thin strip of metal (e.g., a copper-based alloy or a silver-based alloy) having a lengthwise dimension 110 and a widthwise dimension 112. The fuse element 106 has: a top surface 114 and a bottom surface 116; a forward edge 118 and a rearward edge 120 that are spaced apart in the lengthwise dimension 110 and extend in the widthwise dimension 112; and a first side edge 122 and a second side edge 124 that are spaced apart in the widthwise dimension 112 and extend in the lengthwise dimension 110. Although the fuse element 106 has a generally rectangular planform shape in the illustrated embodiment, the fuse element 106 may have any suitable planform shape in other embodiments.

The illustrated fuse element 106 is formed (e.g., stamped and/or bent) such that the top surface 114 and the bottom surface 116 each have a contour that undulates in the lengthwise dimension 110 by virtue of a plurality of strip segments 126 that are sloped relative to one another. More specifically, the fuse element 106 has eleven strip segments 126, namely a first segment 132, a second segment 134, a third segment 136, a fourth segment 138, a fifth segment 140, a sixth segment 142, a seventh segment 144, an eighth segment 146, a ninth segment 148, a tenth segment 150, and an eleventh segment 152. The second segment 134 is sloped upward relative to the first segment 132, and is joined to the first segment 132 at a first fold 154. The third segment 136 is oriented substantially parallel to the first segment 132, and is joined to the second segment 134 at a second fold 156. The fourth segment 138 is sloped downward relative to the third segment 136, and is joined to the third segment 136 at a third fold 158. The fifth segment 140 is sloped upward relative to the fourth segment 138, and is joined to the fourth segment 138 at a fourth fold 160.

Moreover, the sixth segment 142 is oriented substantially parallel to the third segment 136 and the first segment 132, and is joined to the fifth segment 140 at a fifth fold 162. The seventh segment 144 is sloped downward relative to the sixth segment 142, and is joined to the sixth segment 142 at a sixth fold 164. The eighth segment 146 is sloped upward relative to the seventh segment 144, and is joined to the seventh segment 144 at a seventh fold 166. The ninth segment 148 is oriented substantially parallel to the sixth segment 142, the third segment 136, and the first segment 132, and is joined to the eighth segment 146 at an eighth fold 168. The tenth segment 150 is sloped downward relative to the ninth segment 148, and is joined to the ninth segment 148 at a ninth fold 170. The eleventh segment 152 is oriented substantially parallel to the ninth segment 148, the sixth segment 142, the third segment 136, and the first segment 132, and is joined to the tenth segment 150 at a tenth fold 172. In other embodiments, the fuse element 106 may have any suitable shape and contour (e.g., the fuse element 106 may be folded to define any suitable number of segments shaped and oriented relative to one another in any suitable manner to define any suitable surface contours). For example, in some embodiments, the fuse element 106 may not have an undulating top and/or bottom surface contour.

The third segment 136, the sixth segment 142, and the ninth segment 148 are weakened segments, in that each has at least one weak spot (e.g., a spot of reduced cross-section such as, for example, a link defined by at least one perforation or a link defined by at least one indentation). For example, in the illustrated embodiment, each segment 136, 142, 148 has a plurality of perforations 174 that are spaced apart widthwise by a plurality of lengthwise-extending weak spots in the form of fusible links 176. More specifically, the fusible links 176 of the third segment 136 extend lengthwise between the second fold 156 and the third fold 158; the fusible links 176 of the sixth segment 142 extend lengthwise between the fifth fold 162 and the sixth fold 164; and the fusible links 176 of the ninth segment 148 extend lengthwise between the eighth fold 168 and the ninth fold 170. The third segment 136 thus serves as the forwardmost one of the weakened segments 136, 142, 148 of the fuse element 106, and the ninth segment 148 thus serves as the rearwardmost one of the weakened segments 136, 142, 148 of the fuse element 106. Although the fuse element 106 has three weakened segments in the illustrated embodiment, the fuse element 106 may have any suitable number of weakened segments in other embodiments. Moreover, although each weakened segment has seven fusible links in the illustrated embodiment, the weakened segments may in other embodiments have any suitable number of fusible links, and the fusible links may be spaced and oriented in any suitable manner.

During operation of the fuse 100, electrical arcs may develop along the fuse element 106. The arcs tend to occur more frequently at the weakened segments 136, 142, 148, and tend to be largest and longest-lasting along the side edges 122, 124. Moreover, because arcs occurring at the forwardmost weakened segment (e.g., the third segment 136) are more capable of migrating to the forward edge 118 (and, hence, the terminal 104 coupled thereto) before being quenched by the matrix 108, it is desirable to supplement the arc-quenching capability of the matrix 108 between the forwardmost weakened segment (e.g., the third segment 136) and the forward edge 118. Similarly, because arcs occurring at the rearwardmost weakened segment (e.g., the ninth segment 148) are more capable of migrating to the rearward edge 120 (and, hence, the terminal 104 coupled thereto) before being quenched by the matrix 108, it is desirable to also supplement the arc-quenching capability of the matrix 108 between the rearwardmost weakened segment (e.g., the ninth segment 148) and the rearward edge 120.

Figure 4:
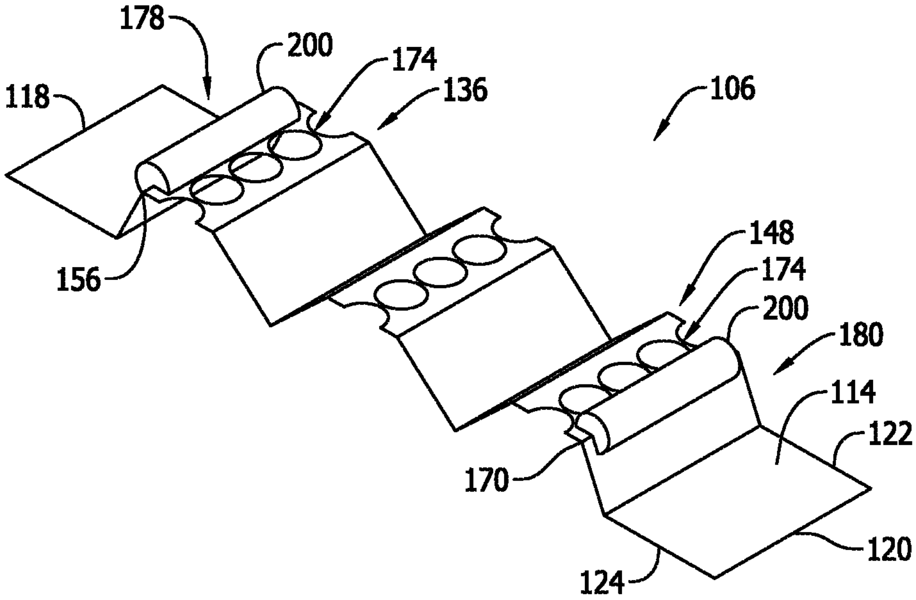
FIG. 4 is a perspective view of an embodiment of the fuse element shown in FIG. 2 with an arc-quenching material attached thereto.

FIG. 4 is a perspective view of an embodiment of the fuse element 106 shown in FIG. 2 with an arc-quenching material 200 attached thereto. In one embodiment, the arc-quenching material 200 is a silicone material such as, for example, an alkoxy silicone material (e.g., the LOCTITE® SI 5088™ material made by Henkel AG & Company, KGaA). In other embodiments, the arc-quenching material 200 may be any suitable material that facilitates enabling the fuse element 106 to be configured, and to function, as described herein.

Notably, the arc-quenching material 200 is attached to the fuse element 106 by dispensing the material 200 onto the top surface 114 of the fuse element 106 while the material 200 is in its liquid state, and the material 200 is then cured (or otherwise permitted to harden) into a rigid or semi-rigid coating. However, to reduce the amount of material 200 used to coat the fuse element 106 (and, hence, to reduce the cost of fabricating the fuse element 106), and in an effort to not encapsulate too much of the fuse element 106 in the material 200 (and, hence, to not impede the proper functionality of the fuse element 106), the material 200 is attached locally, and only to select region(s) of the fuse element 106. For example, in the illustrated embodiment, the material 200 is attached locally, and only to a forward region 178 and a rearward region 180 of the fuse element 106. As used herein, the term "local" (and any variation thereof) refers to being restricted to a smaller region of a larger area (e.g., a region of the fuse element 106 to which the material 200 is "attached locally" is a region that is nearly surrounded by an area of the fuse element 106 to which the material 200 is not attached).

The forward region 178 is between the perforations 174 of the weakened third segment 136 and the forward edge 118, and the rearward region 180 is between the perforations 174 of the weakened ninth segment 148 and the rearward edge 120. For example, in one embodiment, the forward region 178 extends widthwise along the second fold 156, and marginally lengthwise therefrom, thus being spaced apart from the forward edge 118. Similarly, the rearward region 180 extends widthwise along the ninth fold 170, and marginally lengthwise therefrom, thus being spaced apart from the rearward edge 120. In some embodiments, the forward region 178 may not extend widthwise along a fold (e.g., the forward region 178 may not extend along the second fold 156), and the rearward region 180 may not extend widthwise along a fold (e.g., the rearward region 180 may not extend widthwise along the ninth fold 170). In other embodiments, the forward region 178 may have any suitable location between, and spacing relative to, the perforations 174 of the forwardmost weakened segment (e.g., the third segment 136) and/or the forward edge 118, and the rearward region 180 may likewise have any suitable location between, and spacing relative to, the rearwardmost weakened segment (e.g., the ninth segment 148) and/or the rearward edge 120.

Notably, in the illustrated embodiment, the material 200 is attached along the top surface 114 such that the top surface 114 is substantially entirely covered in material 200 within the forward region 178 and the rearward region 180. In other words, on the top surface 114, the second fold 156 and the ninth fold 170 are covered in the material 200 along nearly their entire respective widthwise extensions. However, the side edges 122, 124 are not covered in the material 200, in part because it can be difficult to achieve a desired coverage of the material 200 along the side edges 122, 124. More specifically, because the material 200 is initially applied as a liquid, the surface tension of the material 200 and the minimal surface area of the side edges 122, 124 tend to cause the liquid to retreat away from the side edges 122, 124, thereby leaving at least part of the side edges 122, 124 exposed (or uncovered by the material 200) when the material 200 ultimately cures or otherwise hardens. This can be problematic in some applications given that electrical arcs tend to occur with more frequency along the side edges 122, 124. Moreover, the material 200 also has a tendency to retreat away from the folds 156, 170 for similar reasons, thereby making it difficult to obtain sufficient surface coverage at the folds 156, 170. This can also be problematic in some applications, given that electrical arcs occurring at the folds 156, 170 (or, more generally, the forwardmost and rearwardmost folds), if allowed to persist over an extended period of time, have a higher likelihood of migrating toward the respective edges 118, 120 before being quenched by the matrix 108.

Figure 5:
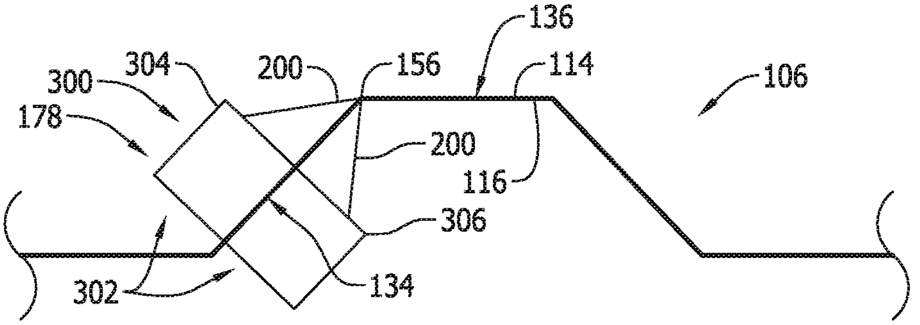
FIG. 5 is a side view of another embodiment of the fuse element shown in FIG. 2 with an arc-quenching material attached thereto.

As shown in the embodiment of FIG. 5, to facilitate obtaining better coverage of the material 200 along the folds 156, 170, a support structure 300 may be attached (e.g., bonded) to the fuse element 106 adjacent each fold 156, 170, and the material 200 may then be applied to the top surface 114 atop of the support structure 300 such that the material 200 is prevented from retreating downward away from the folds 156, 170 (i.e., the support structure 300 holds the material 200 captive at the respective fold 156, 170 until the material 200 cures (or otherwise hardens) on the fold 156, 170.

In the illustrated embodiment, the support structure 300 is in the form of at least one rail 302 (e.g., a rigid or semi-rigid strip of pure silicone) coupled to the fuse element 106 at each respective fold 156, 170. More specifically, at each respective fold 156, 170, a top rail 304 is coupled to the fuse element 106 and extends widthwise between the side edges 122, 124 along the top surface 114 beneath the fold 156, 170, and a bottom rail 306 is coupled to the fuse element 106 and extends widthwise between the side edges 122, 124 along the bottom surface 116 beneath the fold 156, 170. As such, when the material 200 is applied along the fold 156, 170 of each respective region 178, 180, the material 200 is prevented from retreating downward away from the fold 156, 170, thereby retaining the material 200 at the fold 156, 170 until the material 200 cures (or otherwise hardens). In one embodiment, the rail(s) 302 may be removed from the fuse element 106 after the material 200 cures or otherwise hardens, such that the fuse element 106 is installed in the fuse 100 without the rail(s) 302 coupled thereto. In another embodiment, however, the rail(s) 302 may remain on the fuse element 106 after the material 200 cures or otherwise hardens, such that the rail(s) 302 are coupled to the fuse element 106 when the fuse element 106 is installed in the fuse 100. Although the illustrated embodiment employs a rail 302 on each of the top surface 114 and the bottom surface 116 at each respective region 178, 180, other embodiments may utilize a rail 302 on the top surface 114 and not the bottom surface 116, or vice versa.

Figure 6:
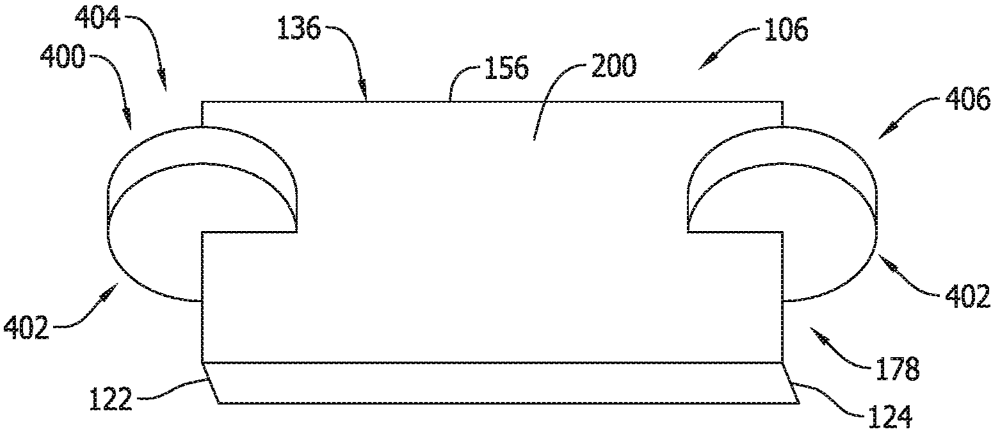
FIG. 6 is a perspective view of yet another embodiment of the fuse element shown in FIG. 2 with an arc-quenching material attached thereto.

In the embodiment of FIG. 6, to facilitate obtaining better coverage of the material 200 along the side edges 122, 124, a support structure 400 may be attached (e.g., bonded) to the fuse element 106 adjacent each region 178, 180, and the material 200 may then be applied to the side edges 122, 124 atop of the support structure 400 such that the material 200 is prevented from retreating away from the side edges 122, 124 (i.e., the support structure 400 holds the material 200 captive at the respective edges 122, 124 until the material 200 cures (or otherwise hardens) on the edges 122, 124). In one embodiment, the material 200 is also attached to at least one of the top surface 114 and the bottom surface 116 widthwise between the edges 122, 124, as illustrated. The material 200 thus wraps around at least one side edge 122, 124, and in some embodiments completely encapsulates the fuse element 106 along a plane extending between (e.g., substantially perpendicular to) the side edges 122, 124 (i.e., a widthwise cross-section of the fuse element 106 taken at the region 178 and/or 180 is completely enclosed by material 200).

In the illustrated embodiment, the support structure 400 is in the form of at least one clip 402 (e.g., a C-clip made of pure silicone) coupled to the fuse element 106 at the side edges 122, 124 such that each clip 402 spans its respective side edge 122, 124. More specifically, at each respective region 178, 180, a first clip 404 is coupled to first side edge 122 beneath the respective fold 156, 170, and a second clip 406 is coupled to second side edge 124 beneath the respective fold 156, 170. When the material 200 is applied to each respective region 178, 180, the material 200 is prevented from retreating away from the edges 122, 124 by the clip(s) 404, 406, thereby retaining the material 200 at the edges 122, 124 until the material cures (or otherwise hardens) in a state of wrapping around the respective edge(s) 122, 124.

In one embodiment, the clip(s) 402 may be removed from the fuse element 106 after the material 200 cures or otherwise hardens, such that the fuse element 106 is installed in the fuse 100 without the clip(s) 402 coupled thereto. In another embodiment, however, the clip(s) 402 may remain on the fuse element 106 after the material 200 cures or otherwise hardens, such that the clip(s) 402 are coupled to the fuse element 106 when the fuse element 106 is installed in the fuse 100. Although the illustrated embodiment employs a clip 402 on each of side edge 122, 124 at each respective region 178, 180, other embodiments may utilize a clip 402 on the first side edge 122 but not the second side edge 124, or vice versa. Notably, the support structure 400 may suitably be used in conjunction with the support structure 300 (i.e., the clip(s) 402 are suitable for use together with the rail(s) 302 in some embodiments); or, in other embodiments, the support structures 300, 400 may be integrally molded together as a single-piece, unitary support structure that completely envelops the fuse element 106 at the respective region 178, 180.

Figure 7:
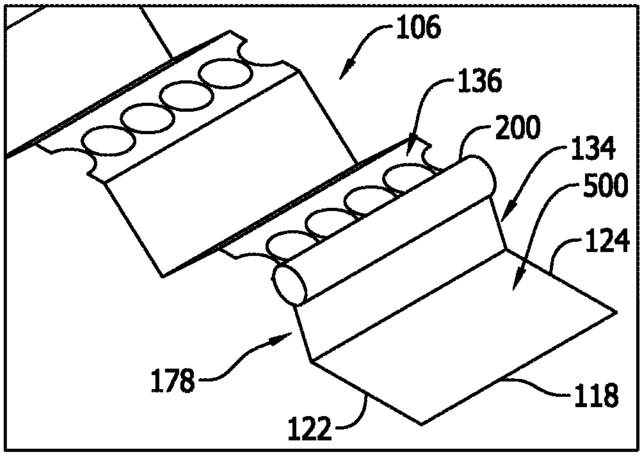
FIG. 7 is a perspective view of yet another embodiment of the fuse element shown in FIG. 2 with an arc-quenching material attached thereto.

In the embodiment of FIG. 7, rather than dispensing the material 200 onto the forward region 178 and/or the rearward region 180 as with the embodiments above, the fuse element 106 may instead be dipped into a reservoir of the material 200 to achieve complete coverage of the forward and/or rearward regions 178, 180 (e.g., to fully encapsulate the forward and/or rearward regions 178, 180 along a plane extending between the side edges 122, 124 as set forth above). More specifically, the forward edge 118 of the fuse element 106 may be dipped into a reservoir of the material 200 until the forward region 178 is submerged, and the material 200 is then permitted to cure (or otherwise harden) on the forward region 178 after the forward edge 118 has been removed from the reservoir. Similarly, the rearward edge 120 of the fuse element 106 may be dipped into a reservoir of the material 200 until the rearward region 180 is submerged, and the material 200 is then permitted to cure (or otherwise harden) on the reward region 180 after the rearward edge 120 has been removed from the reservoir. However, to prevent encapsulating the entire fuse element 106 from the forward region 178 all the way to the forward edge 118, and/or from the rearward region 180 all the way to the rearward edge 120, a mask 500 may be attached to the fuse element 106 between the forward region 178 and the forward edge 118, and/or between the rearward region 180 and the rearward edge 120, before dipping. In this manner, after the forward and/or rearward edges 118, 120 have been removed from the material 200 in the reservoir, the mask(s) 500 may then be removed, leaving only the forward and/or rearward regions 178, 180 of the fuse element 106 covered in the material 200. Notably, FIG. 7 illustrates the fuse element 106 after the forward edge 118 had already been dipped in, and removed from, the reservoir of material 200, but prior to the associated mask 500 having been removed.

Figure 8:
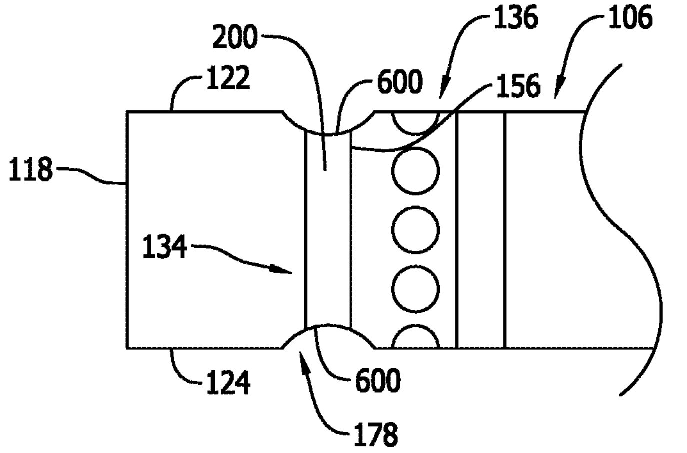
FIG. 8 is a plan view of yet another embodiment of the fuse element shown in FIG. 2 with an arc-quenching material attached thereto.
Figure 9:
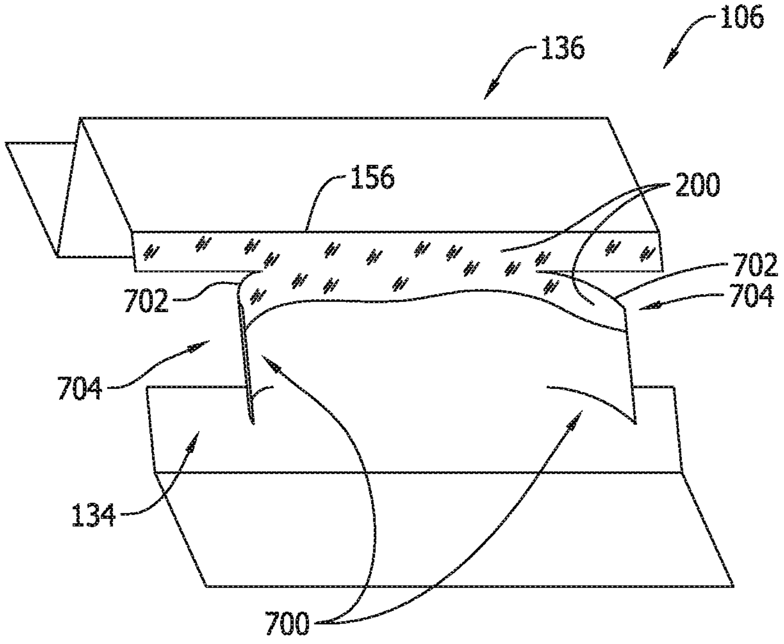
FIG. 9 is a perspective view of yet another embodiment of the fuse element shown in FIG. 2 with an arc-quenching material attached thereto.

Alternatively, as shown in the embodiment of FIG. 8, at least one side edge 122, 124 of the fuse element 106 may be provided with an indented segment 600, and the material 200 may be attached to the fuse element 106 adjacent the indented segment(s) 600 (e.g., widthwise between opposed indented segments 600 as illustrated). The indented segment(s) 600 facilitate inhibiting the formation of electrical arcs along the respective side edges 122, 124. Moreover, as shown in the embodiment of FIG. 9, at least one wing 700 may be cut and bent upward at the side edge(s) 122, 124, and the material 200 may be applied to an upper edge 702 of each wing 700. Thus, a cutout 704 is formed at each respective side edge 122, 124 to inhibit the formation of electrical arcs therealong, but the overall current-carrying mass of the fuse element 106 is not reduced by virtue of creating such cutouts 704 and, hence, the current-carrying capability of the fuse element 106 is not decreased.

The benefits of the inventive concepts described are now believed to have been amply illustrated in relation to the exemplary embodiments disclosed.

An embodiment of a fuse element assembly has been disclosed. The fuse element assembly includes a fuse element having a pair of side edges and at least one weak spot between the side edges. The fuse element assembly also includes an arc-quenching material attached locally to the fuse element adjacent the weak spot.

Optionally, the arc-quenching material may wrap around at least one of the side edges. The arc-quenching material may also completely encapsulate the fuse element in a plane extending between the side edges. Additionally, each of the side edges may have an indented segment near the weak spot. Moreover, the fuse element may have a fold extending between the side edges adjacent the weak spot, and the fold may be covered in the arc-quenching material. Additionally, a support structure may be coupled to the fuse element beneath the arc-quenching material. A pair of wings may also be bent upwardly at the side edges, and each wing may have an upper edge covered in the arc-quenching material.

An embodiment of a method of fabricating a fuse element assembly is also disclosed. The method includes forming a fuse element having a pair of side edges and at least one weak spot between the side edges. The method further includes locally attaching an arc-quenching material to the fuse element adjacent the weak spot.

Optionally, the method may include wrapping the arc-quenching material around at least one of the side edges. The method may also include encapsulating the fuse element in the material in a plane extending between the side edges by at least one of: dispensing the material at the side edges; and dipping the side edges in a reservoir of the material after attaching a removable mask to the fuse element. Moreover, the method may include forming an indented segment along each side edge near the weak spot. The method may also include folding the fuse element between the side edges and adjacent the weak spot, and covering the fold in the arc-quenching material. The method may additionally include coupling a support structure to the fuse element, and applying the arc-quenching material to the fuse element atop of the support structure. The method may further include bending a pair of wings upwardly at the side edges of the fuse element, and covering an upper edge of each wing with the arc-quenching material.

An embodiment of a fuse is also disclosed. The fuse includes a housing and a pair of terminals coupled to the housing. The fuse also includes an arc-quenching matrix contained within the housing, and a fuse element assembly embedded in the matrix and extending between the terminals within the housing. The fuse element assembly includes a fuse element having a pair of side edges and at least one weak spot between the side edges. The fuse element assembly also includes an arc-quenching material attached locally to the fuse element adjacent the weak spot.

Optionally, the fuse may be a high-voltage, direct current (DC) fuse. The fuse may have a voltage rating of at least 500 VDC. Furthermore, the housing may be compact such that the fuse is made for use in a power system of an electric vehicle (EV). Moreover, the arc-quenching material may wrap around at least one of the side edges. Additionally, the arc-quenching material may completely encapsulate the fuse element in a plane extending between the side edges.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuse element assembly comprising:

a pair of metal strip fuse elements, wherein each of the pair of metal strip fuse elements respectively includes:

a pair of side edges;

a forward edge and a rearward edge opposite the forward edge;

a forward region located adjacent the forward edge;

a rearward region located adjacent the rearward edge;

a plurality of perforations extending transversely to the pair of side edges at multiple locations between the forward edge and the rearward edge and respectively spaced from one another, wherein the plurality of perforations at each respective one of the multiple locations defines a plurality of weak spots of reduced cross sectional area in the metal strip that respectively extend in between adjacent ones of the plurality of perforations;

a first arc-quenching material coating of a rigid or semi-rigid hardened liquid silicone attached locally to the forward region adjacent a first one of the multiple locations that is nearest the forward edge, wherein the first arc-quenching material coating does not cover any portion of the plurality of weak spots of reduced cross sectional area in the metal strip; and a second arc-quenching material coating of a rigid or semi-rigid hardened liquid silicone attached locally to the rearward region adjacent a second one of the multiple locations nearest the rearward edge, wherein the second arc-quenching material coating does not cover any portion of the plurality of weak spots of reduced cross sectional area in the metal strip;

wherein one or more of the side edges in at least one of the pair of metal strip fuse elements has an indented segment, and wherein the first arc-quenching material coating or the second arc-quenching material coating is attached at the indented segment, and wherein the pair of metal strip fuse elements provided with a combination of the first arc-quenching material coating and the second arc-quenching material coating realizes a voltage rating of at least 500 VDC and a current rating of at least 150 A when connected in parallel in an overcurrent protection fuse.

2. The fuse element assembly of claim 1, wherein at least one of the first arc-quenching material coating and the second arc-quenching material coating wraps around at least one of the pair of side edges in each of the pair of metal strip fuse elements.

3. The fuse element assembly of claim 2, wherein at least one of the first arc-quenching material coating and the second arc-quenching material coating completely encapsulates each of the pair of metal strip fuse elements in a plane extending between the respective pair of side edges.

4. The fuse element assembly of claim 1, wherein each of the pair of metal strip fuse elements includes a first fold and a second fold that is respectively covered by the first arc-quenching material coating or the second arc-quenching material coating.

5. The fuse element assembly of claim 1, wherein an indentation of the indented segment comprises an arcuate shape, and wherein the indentation of the indented segment is associated with a reduced width between the one or more of the side edges.

6. The fuse element assembly of claim 1, wherein all of the plurality of weak spots of reduced cross sectional area at the multiple locations in each of the pair of metal strip fuse elements are positioned between the first arc-quenching material coating and the second arc-quenching material coating in each of the pair of metal strip fuse elements.

7. The fuse element assembly of claim 1 wherein at least one of the pair of metal strip fuse elements has an undulating surface contour.

8. The fuse element assembly of claim 1, wherein the forward edge and the rearward edge of each of the metal strip fuse elements extend coplanar to one another in a first plane, and wherein the plurality of weak spots of reduced cross sectional area at each of the multiple locations extend coplanar to one another in a second plane spaced from the first plane.

9. A fuse comprising:

a housing;

a pair of terminals attached to the housing;

an arc-quenching matrix contained within the housing; and a fuse element assembly embedded in the arc-quenching matrix and extending between the pair of terminals within the housing, the fuse element assembly operable with a voltage rating of at least 500 VDC and a current rating of at least 150 A and comprising a pair of metal strip fuse elements connected in parallel inside the housing and between the pair of terminals, wherein each of the pair of metal strip fuse elements respectively includes:

a pair of side edges;

a forward edge and a rearward edge opposite the forward edge;

a forward region located adjacent the forward edge;

a rearward region located adjacent the rearward edge; and a plurality of perforations extending transversely to the pair of side edges at multiple locations between the forward edge and the rearward edge, wherein each of the plurality of perforations at each respective one of the multiple locations defines a plurality of weak spots of reduced cross sectional area in the metal strip fuse element that respectively extend between adjacent ones of the plurality of perforations;

a first arc-quenching material attached locally to the forward region at a first location between the forward edge and a first one of the multiple locations nearest the forward edge, the first arc-quenching material attached adjacent to but spaced from the plurality of perforations of reduced cross sectional area at the first location, wherein the first arc-quenching material does not cover any portion of the plurality of weak spots; and a second arc-quenching material attached locally to the rearward region at a second location between the rearward edge and a second one of the multiple locations nearest the rearward edge, the second arc-quenching material attached adjacent to but spaced from the plurality of perforations of reduced cross sectional area at the second location, wherein the second arc-quenching material does not cover any portion of the plurality of weak spots, wherein at least one of the first arc-quenching material and the second arc-quenching material is attached locally as a rigid or semi-rigid coating of a hardened alkoxy silicone adhesive liquid, wherein one or more of the side edges in at least one of the pair of metal strip fuse elements has an indented segment, and wherein the first arc-quenching material or the second arc-quenching material is attached at the indented segment, and wherein the first arc-quenching material and the second arc-quenching material supplement the arc-quenching matrix and in combination facilitate the voltage rating of at least 500 VDC and the current rating of at least 150 A.

10. The fuse of claim 9, wherein the housing has a compact volume of less than about four cubic inches.

11. The fuse of claim 9, wherein the rigid or semi-rigid coating of the hardened alkoxy silicone adhesive liquid wraps around at least one of the pair of side edges in at least one of the pair of metal strip fuse elements.

12. The fuse of claim 11, wherein the rigid or semi-rigid coating of the hardened alkoxy silicone adhesive liquid completely encapsulates at least one of the pair of metal strip fuse elements in a plane extending between the respective pair of side edges.

13. The fuse of claim 9, wherein all of the plurality of weak spots of reduced cross sectional area at the multiple locations are positioned between the first arc-quenching material and the second arc-quenching material in each of the pair of fuse elements.

14. The fuse of claim 9, wherein an indentation of the indented segment comprises an arcuate shape, and wherein the indentation of the indented segment is associated with a reduced width between the one or more of the side edges.

15. The fuse of claim 9, wherein the pair of metal strip fuse elements in combination provide full-range time-current operation.

16. A fuse comprising:

a housing;

a pair of terminals attached to the housing;

a granular arc-quenching matrix contained within the housing; and a fuse element assembly embedded in the granular arc-quenching matrix and extending between the pair of terminals within the housing, the fuse element assembly comprising a pair of undulating metal strip fuse elements including multiple folds along an axial length thereof, the pair of metal strip fuse elements being directly connected to and between each respective one of the pair of terminals and therefore connected in parallel inside the housing, wherein each of the pair of undulating metal strip fuse elements further includes:

a forward edge and a rearward edge opposite the forward edge that respectively are directly connected to one of the pair of terminals;

a forward region located adjacent the forward edge;

a rearward region located adjacent the rearward edge;

a pair of side edges and a plurality of perforations extending transversely to the pair of side edges at multiple spaced apart locations to one another and in between the forward region and the rearward region, wherein each of the plurality of perforations at each respective one of the multiple locations defines a plurality of weak spots of reduced cross sectional area in the undulating metal strip fuse element that respectively extend between adjacent ones of the plurality of perforations;

a first arc-quenching material of a hardened liquid silicone attached locally to the undulating metal strip fuse element in the forward region at a first location adjacent a nearest one of the multiple folds and a nearest one of the plurality of perforations to the forward region, wherein the first arc-quenching material extends in surface contact with the pair of side edges and in surface contact with opposing surfaces of the undulating metal strip at the first location but does not extend to any of the plurality of weak spots at the first location; and a second arc-quenching material of a hardened liquid silicone attached locally to the undulating metal strip fuse element in the rearward region at a second location adjacent a nearest one of the multiple folds and a nearest one of the plurality of perforations to the rearward region, wherein the second arc-quenching material extends in surface contact with the pair of side edges and in surface contact with the opposing surfaces of the undulating metal strip at the second location but does not extend to any of the plurality of weak spots at the second location, wherein one or more of the side edges in at least one of the pair of metal strip fuse elements has an indented segment, and wherein the first arc-quenching material or the second arc-quenching material is attached at the indented segment.

17. The fuse of claim 16, wherein the hardened liquid silicone material comprises a hardened alkoxy silicone adhesive liquid.

18. The fuse of claim 16, wherein the first and second arc-quenching material in each of the pair of undulating metal strip fuse elements covers the nearest one of the multiple folds at the first location and at the second location.

19. The fuse of claim 16, wherein the fuse has a voltage rating of at least 500 VDC and a current rating of at least 150 A.

20. The fuse of claim 16, wherein an indentation of the indented segment comprises an arcuate shape, and wherein the indentation of the indented segment is associated with a reduced width between the one or more of the side edges.

* * * * *